United States Patent
Tseng et al.

(10) Patent No.: US 9,303,799 B2
(45) Date of Patent: Apr. 5, 2016

(54) LINED SLEEVE FOR TUBE WELDING

(71) Applicant: NATIONAL PINGTUNG UNIVERSITY OF SCIENCE AND TECHNOLOGY, Pingtung County (TW)

(72) Inventors: Kuang-Hung Tseng, Pingtung County (TW); Jie-Meng Huang, Pingtung County (TW)

(73) Assignee: NATIONAL PINGTUNG UNIVERSITY OF SCIENCE & TECHNOLOGY, Pingtung County (TW)

( * ) Notice: Subject to any disclaimer, the term of this patent is extended or adjusted under 35 U.S.C. 154(b) by 28 days.

(21) Appl. No.: 14/148,603

(22) Filed: Jan. 6, 2014

(65) Prior Publication Data

US 2014/0361528 A1   Dec. 11, 2014

(30) Foreign Application Priority Data

Jun. 5, 2013  (TW) .............................. 102119982 U

(51) Int. Cl.
| | |
|---|---|
| *F16L 13/02* | (2006.01) |
| *B23K 9/028* | (2006.01) |
| *B23K 9/035* | (2006.01) |
| *B23K 9/167* | (2006.01) |
| *B23K 37/053* | (2006.01) |

(52) U.S. Cl.
CPC ........... *F16L 13/0227* (2013.01); *B23K 9/0282* (2013.01); *B23K 9/0358* (2013.01); *B23K 9/167* (2013.01); *B23K 37/0531* (2013.01)

(58) Field of Classification Search
CPC .... F16L 13/0227; F16L 13/0245; B23K 1/00; B23K 37/0531

USPC ............ 285/288.5, 288.6, 288.9, 288.11, 370
See application file for complete search history.

(56) References Cited

U.S. PATENT DOCUMENTS

| | | | | |
|---|---|---|---|---|
| 1,920,449 | A * | 8/1933 | Unke .......................... | 285/288.11 |
| 1,960,105 | A * | 5/1934 | Greene ..................... | 285/288.11 |
| 1,980,530 | A * | 11/1934 | Hutchison ................ | 285/288.11 |
| 1,980,561 | A * | 11/1934 | Wagner ..................... | 285/288.11 |
| 1,987,341 | A * | 1/1935 | Kachel ........................ | 228/216 |
| RE22,725 | E * | 2/1946 | Von Ahrens ............. | 285/288.11 |
| 2,448,107 | A * | 8/1948 | Mattimore et al. ....... | 285/288.11 |
| 2,472,523 | A * | 6/1949 | Dillon et al. .................... | 228/50 |
| 2,569,956 | A * | 10/1951 | Schiltknecht .............. | 285/288.6 |
| 2,646,995 | A * | 7/1953 | Thompson ............... | 285/288.11 |
| 2,732,229 | A * | 1/1956 | Gaum ...................... | 285/288.11 |
| 2,977,916 | A * | 4/1961 | Hawkins ...................... | 269/48.1 |
| 3,514,128 | A * | 5/1970 | Rohrberg et al. .......... | 285/288.1 |
| 4,084,739 | A * | 4/1978 | Koltz et al. .................... | 228/168 |
| 4,283,616 | A | 8/1981 | Bacha | |
| 4,400,019 | A * | 8/1983 | Fruck ....................... | 285/288.11 |
| 4,728,126 | A * | 3/1988 | Sundholm ................ | 285/288.11 |
| 5,609,291 | A * | 3/1997 | Hummel ...................... | 228/212 |
| 5,726,408 | A * | 3/1998 | Easterday ....................... | 228/50 |
| 6,769,719 | B2 | 8/2004 | Genoni | |
| 6,939,083 | B2 * | 9/2005 | Tosi et al. .................. | 285/288.1 |
| 7,431,341 | B2 * | 10/2008 | McIntyre ..................... | 285/370 |

* cited by examiner

*Primary Examiner* — David E Bochna
(74) *Attorney, Agent, or Firm* — Muncy, Geissler, Olds & Lowe, P.C.

(57) ABSTRACT

A lined sleeve for tube welding is in the form of an inner tube including a first protruded portion and a second protruded portion. The first protruded portion and the second protruded portion are respectively received in two ends respectively of two tubes to be welded together. The inner tube further includes a recessed portion between the first protruded portion and the second protruded portion.

1 Claim, 5 Drawing Sheets

LINED SLEEVE FOR TUBE WELDING

BACKGROUND OF THE INVENTION

1. Field of the Invention

The present invention relates to a lined sleeve for tube welding and, more particularly, to a lined sleeve mounted in two tubes to be welded together to avoid failure of the tubes resulting from excessive fusion in a root of a weld or resulting from a collapse in a surface of the weld.

2. Description of the Related Art

Arc, plasma, laser beam, and electron bean are generally used to join metals together through heating. Specifically, with reference to FIG. 1, two tubes T1 and T2 to be welded together are placed end to end to form a welding zone (the adjoining zone between the tubes T1 and T2). Local heating is carried out at the welding zone to increase the temperature of the welding zone to be higher than the melting point of the tube metals T1 and T2, causing local fusion of the tubes T1 and T2. A weld 9 is formed after cooling, and a weldment is obtained.

However, excessive fusion of the weld 9 occurs easily in the hollow tubes T1 and T2 such that a large diameter difference is generated between the weld 9 and the tubes T1 and T2. In a case that the weldment is repeatedly subjected to stress, the diameter difference hinders smooth transmission of the stress and causes sharp corners between the weld 9 and the tubes T1 and T2, which results in stress concentration at the sharp corners, reduction of the fatigue strength of the weldment, and generation of cracks in the weld 9 or failure of the weld 9, shortening the service life of the weldment.

Furthermore, excessive collapses are liable to occur in the surface 92 of the weld 9 under the action of the high-temperature arc and plasma arc pressure during welding, requiring subsequent repair operation of the surface 92 of the weld 9.

Thus, a need exists for a novel lined sleeve for tube welding to avoid the disadvantages of the welding quality of the welded tubes.

SUMMARY OF THE INVENTION

The primary objective of the present invention is to provide a lined sleeve for tube welding to effectively avoid stress concentration resulting from excessive fusion in the root of the weld, avoiding cracks in the weld or failure of the weld to prolong the service life of the weldment.

Another objective of the present invention is to provide a lined sleeve for tube welding to effectively prevent collapses in the surface of the weld, eliminating the need of subsequent repair operation of the surface of the weld.

The present invention fulfills the above objectives by providing a lined sleeve for tube welding in the form of an inner tube including a first protruded portion and a second protruded portion. The first protruded portion and the second protruded portion are adapted to be respectively received in two ends respectively of two tubes to be welded together. The inner tube further includes a recessed portion between the first protruded portion and the second protruded portion.

Preferably, the inner tube includes at least one through-hole extending from an outer surface of the inner tube through an inner surface of the inner tube.

The at least one through-hole can be located in the recessed portion, an intersection of the recessed portion and the first protruded portion, or an intersection of the recessed portion and the second protruded portion.

The lined sleeve for tube welding according to the present invention includes the recessed portion aligned with the welding zone to avoid a large diameter difference between the root of the weld and the tubes. Thus, stress concentration at sharp corners is avoided, increasing the fatigue strength of the weldment and prolonging the service life of the weldment.

Furthermore, a gas chamber is defined between the recessed portion and the inner peripheries of the tubes. The shielding gas received in the gas chamber will expand to support the weld, avoiding collapses in the surface of the weld, eliminating the need of subsequent repair operation of the surface of the weld.

Furthermore, the through-holes in the lined sleeve for tube welding are in communication with the gas chamber such that the heated, expanding, high-temperature gas can be discharged out of the gas chamber via the through-holes, avoiding irregular protrusions on the surface of the weld due to excessive expansion of the high-temperature gas.

The present invention will become clearer in light of the following detailed description of illustrative embodiments of this invention described in connection with the drawings.

DETAILED DESCRIPTION OF THE INVENTION

Figure 1:
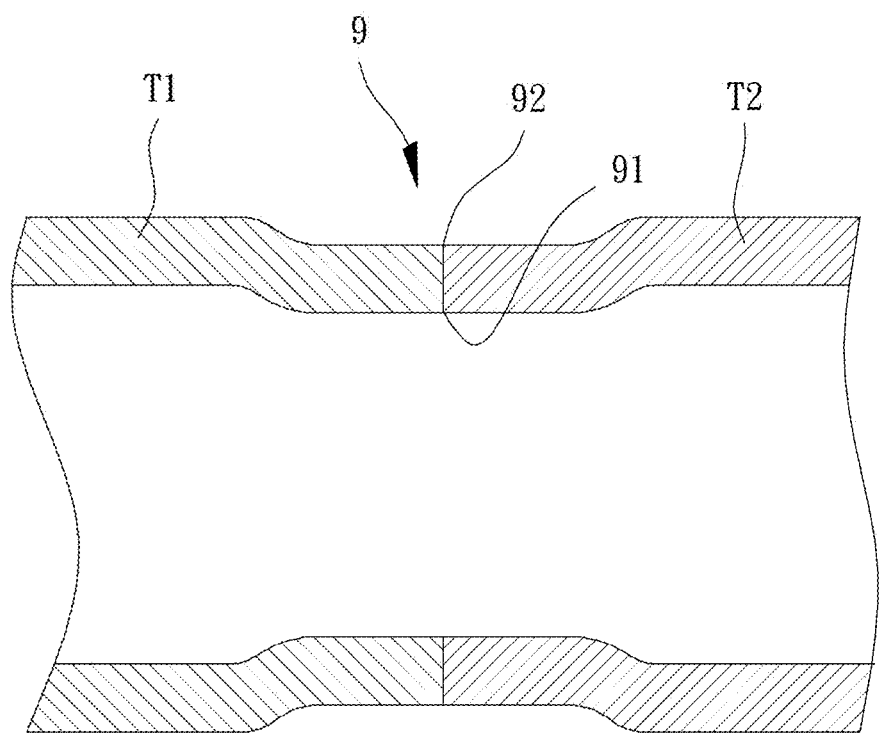
FIG. 1 is a cross sectional view of two tubes welded end to end according to the prior art.
Figure 2:
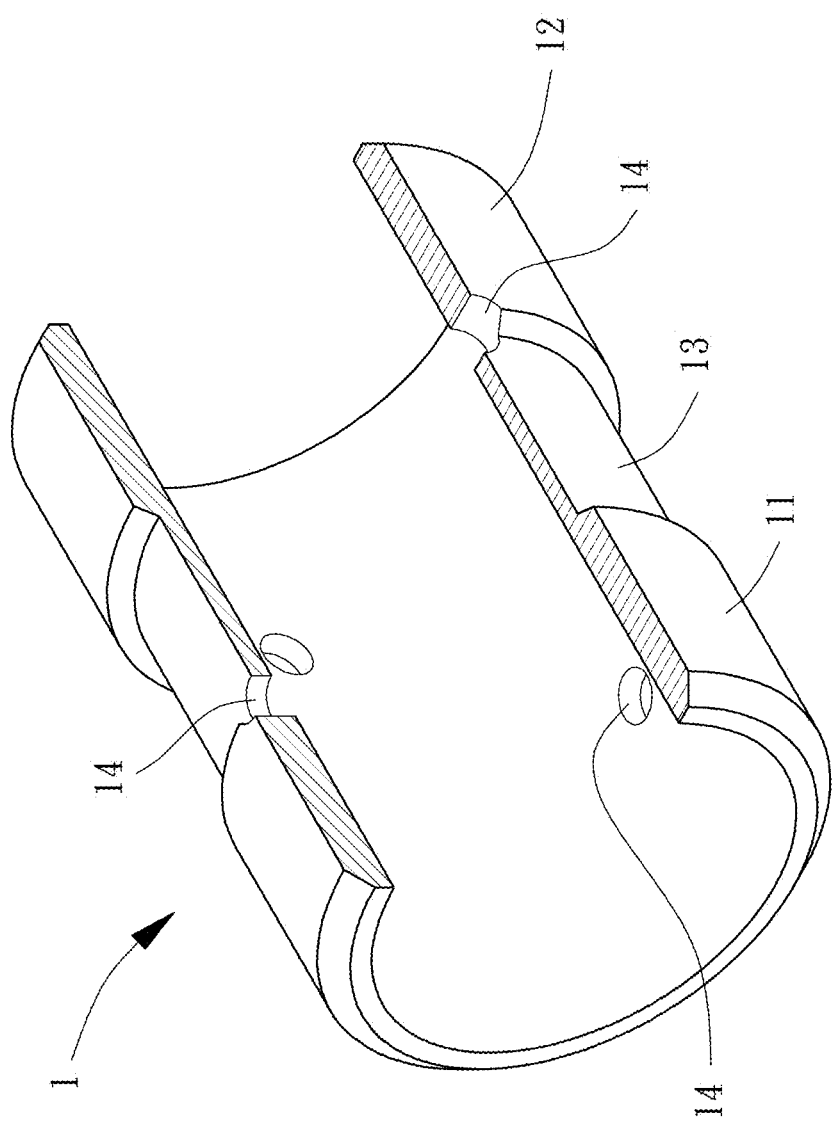
FIG. 2 is a perspective view of a lined sleeve for tube welding according to the present invention, with portions of the lined sleeve cut away.

FIG. 2 shows a lined sleeve for tube welding of an example according to the present invention. The lined sleeve is in the form of an inner tube 1 including a first protruded portion 11 and a second protruded portion 12 respectively on opposite ends of the inner tube 1. The first protruded portion 11 and the second protruded portion 12 are adapted to be respectively received in two ends respectively of two tubes T1 and T2 to be welded together and are adapted to abut inner peripheries respectively of the tubes T1 and T2 (see FIGS. 3 and 4). The inner tube 1 further includes a recessed portion 13 between the first protruded portion 11 and the second protruded portion 12.

Preferably, the inner tube 1 further includes at least one through-hole 14 extending from an outer surface of the inner tube 1 through an inner surface of the inner tube 1. The at least one through-hole 14 can be located in the recessed portion 13, an intersection of the recessed portion 13 and the first protruded portion 11, or an intersection of the recessed portion 13 and the second protruded portion 12.

Figure 3:
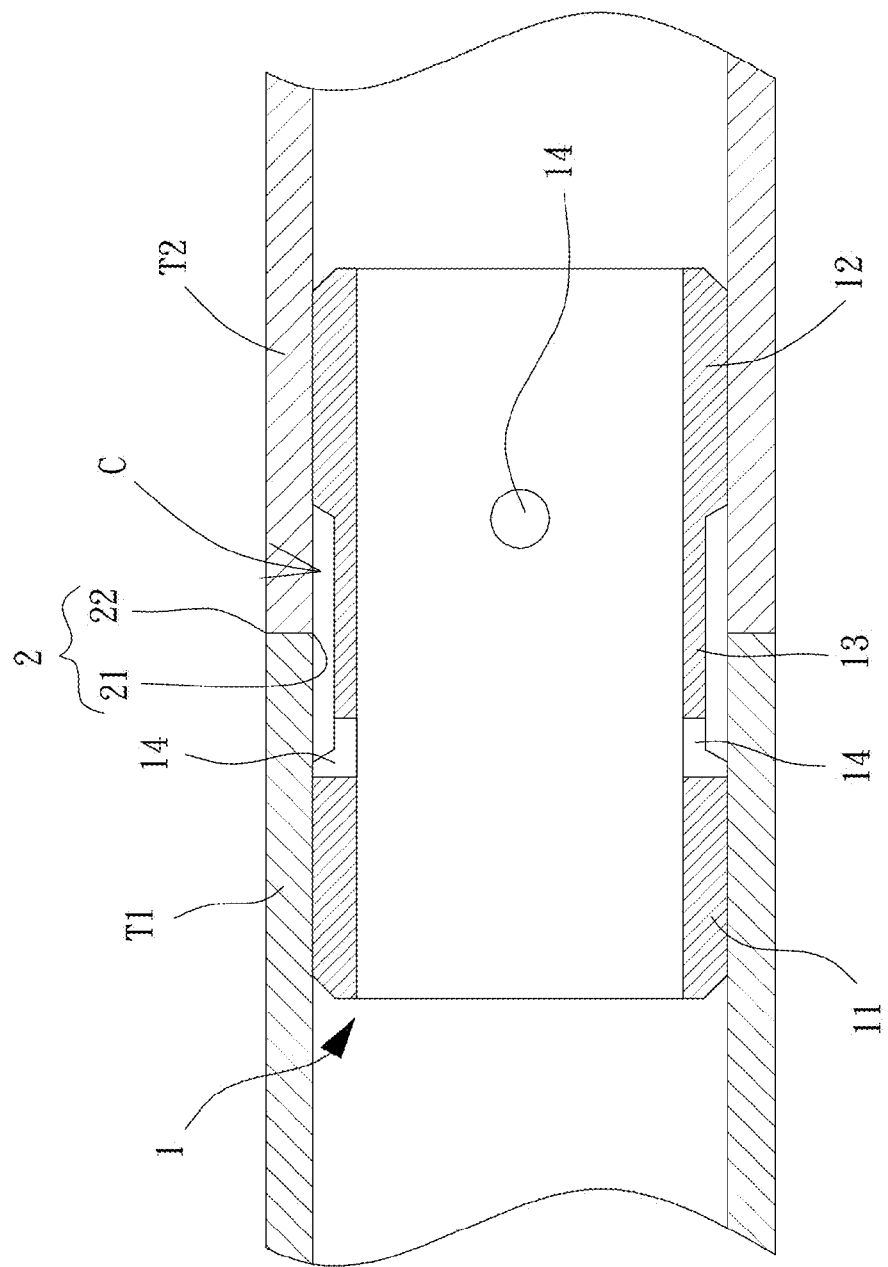
FIG. 3 is a partial, cross sectional view of two tubes to be welded together and the lined sleeve according to the present invention.
Figure 4:
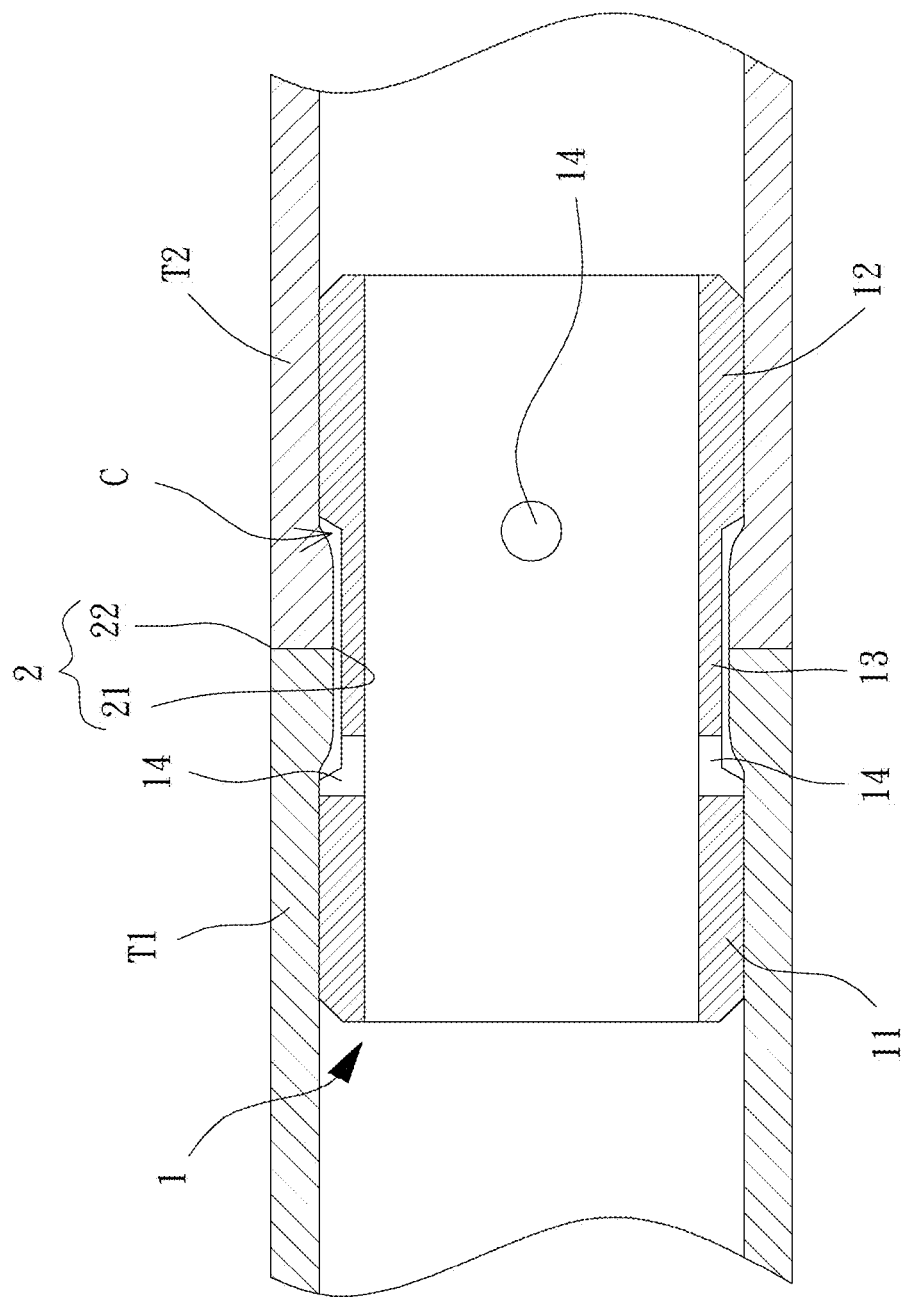
FIG. 4 is a view similar to FIG. 3, with the tubes welded together.

With reference to FIGS. 3 and 4, in use of the inner sleeve according to the present invention with two tubes T1 and T2 to be welded, the inner tube 1 is mounted in the tubes T1 and T2, with the first protruded portion 11 abutting the inner periphery of the tube T1, with the second protruded portion 12 abutting the inner periphery of the tube T2, and with the recessed portion 13 aligned with an adjoining zone between the tubes T1 and T2 (i.e., the welding zone). Then, welding can be carried out at the welding zone by a worker to form a weld 2 that joins the tube T1 to the tube T2 to form a weldment.

Since the recessed portion 13 is aligned with the welding zone, even if excessive fusion occurs in the root 21 of the weld 2, the tube walls of the tubes T1 and T2 are limited by the recessed portion 12 to avoid a large diameter difference between the root 21 of the weld 2 and the tubes T1 and T2. Thus, stress concentration at sharp corners is avoided, increasing the fatigue strength of the weldment and prolonging the service life of the weldment.

Furthermore, a gas chamber C is defined between the recessed portion 12 and the inner peripheries of the tubes T1 and T2. A shielding gas received in the gas chamber C will expand to support the weld 2, avoiding collapses in the surface 22 of the weld 2, eliminating the need of subsequent repair operation of the surface 22 of the weld 2.

Furthermore, the through-holes 14 in the lined sleeve for tube welding are in communication with the gas chamber C such that the heated, expanding, high-temperature gas can be discharged out of the gas chamber C via the through-holes 14, avoiding irregular protrusions on the surface 22 of the weld 2 due to excessive expansion of the high-temperature gas.

Tests using gas tungsten arc welding (GTAW) process were conducted to prove that the lined sleeve for tube welding according to the present invention can effectively reduce the diameter difference between the root 21 of the weld 2 and the tubes T1 and T2, prolonging the service life of the weldment and increasing the productivity.

The diameter of each tube T1, T2 was 36.4 mm. The thickness of each tube T1, T2 was 0.8 mm. The pulse peak current was 30 amperes. The pulse base current was 14 amperes. The arc length was 2 mm. The welding speed was 100 mm/sec. The shielding gas was pure argon. The flow rate of the pure argon was 10 L/min. Table 1 shows the test results.

TABLE 1

Comparison of weld shape made with and without lined sleeve

| Example | Weld width | Weld depth | Collapse in the surface of weld | Prominence on the root of weld |
|---|---|---|---|---|
| A | 4.83 mm | 0.82 mm | 0.26 mm | 0.31 mm |
| B | 4.98 mm | 0.90 mm | 0 | 0.12 mm |

Figure 5A:
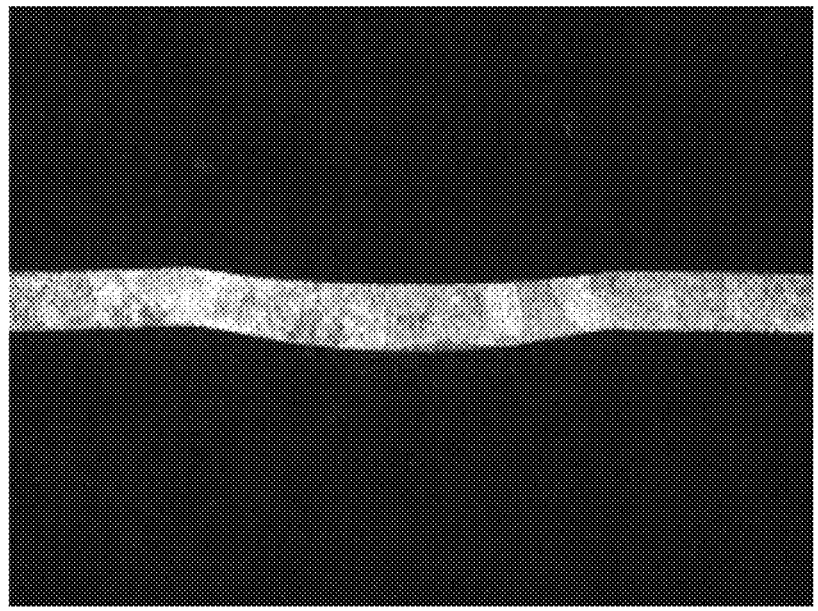
FIG. 5A is a photograph of two tubes welded by gas tungsten arc welding without using the lined sleeve according to the present invention.
Figure 5B:
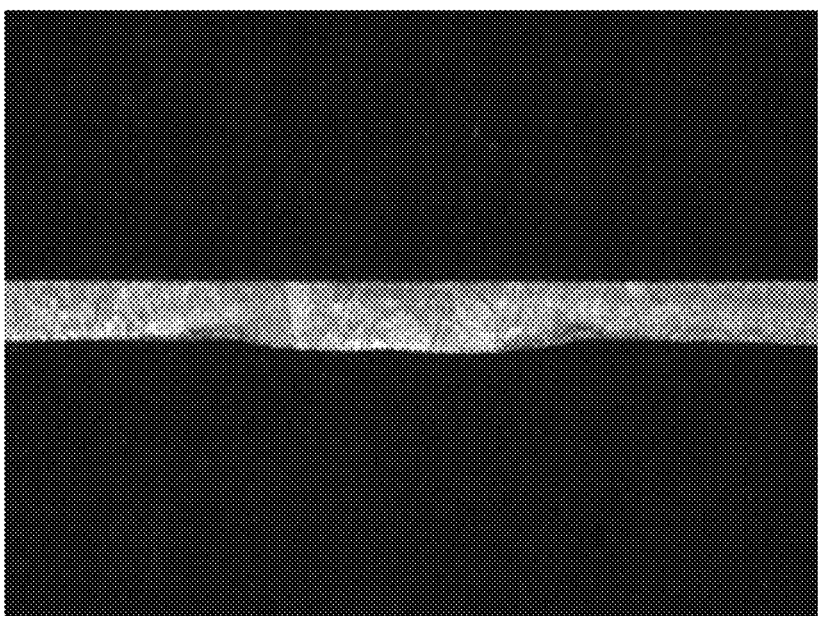
FIG. 5B is a photograph of two tubes welded by gas tungsten arc welding using the lined sleeve according to the present invention.

FIG. 5A shows two tubes welded by GTAW without lined sleeve according to the present invention (Example A). FIG. 5B shows two tubes welded by GTAW with lined sleeve according to the present invention (Example B). According to the test results shown in Table 1, the lined sleeve for tube welding according to the present invention can effectively reduce excessive fusion at the root of the weld 21, the surface 22 of the weld 2, and the tubes T1 and T2 and can effectively avoid collapses in the surface 22 of the weld 2.

In view of the foregoing, the lined sleeve for tube welding according to the present invention includes the recessed portion 13 aligned with the welding zone to avoid a large diameter difference between the root 21 of the weld 2 and the tubes T1 and T2. Thus, stress concentration at sharp corners is avoided, increasing the fatigue strength of the weldment and prolonging the service life of the weldment.

Furthermore, a gas chamber C is defined between the recessed portion 13 and the inner peripheries of the tubes T1 and T2. The shielding gas received in the gas chamber C will expand to support the weld 2, avoiding collapses in the surface 22 of the weld 2, eliminating the need of subsequent repair operation of the surface 22 of the weld 2.

Furthermore, the through-holes 14 in the lined sleeve for tube welding are in communication with the gas chamber C such that the heated, expanding, high-temperature gas can be discharged out of the gas chamber C via the through-holes 14, avoiding irregular protrusions on the surface 22 of the weld 2 due to excessive expansion of the high-temperature gas.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A lined sleeve for tube welding in a form of an inner tube comprising a first protruded portion, a second protruded portion and two through-holes, with each through-hole extending in a direction from an outer surface of the inner tube through an inner surface of the inner tube, with each through-hole having a varying length in said direction, with the first protruded portion and the second protruded portion adapted to be respectively received in two ends respectively of two tubes to be welded together, with the inner tube further comprising a recessed portion extending from the first protruded portion to the second protruded portion, with one of the two through-holes located in an intersection of the recessed portion and the first protruded portion, with another one of the two through-holes located in an intersection of the recessed portion and the second protruded portion.

* * * * *